United States Patent [19]

Halpern

[11] 4,076,443
[45] Feb. 28, 1978

[54] CUTTING TOOL ASSEMBLY

[76] Inventor: William Halpern, Haviland Road, Harrison, N.Y. 10528

[21] Appl. No.: 757,495

[22] Filed: Jan. 7, 1977

[51] Int. Cl.² ........................ B23B 51/00; B23B 31/10
[52] U.S. Cl. .................................... 408/191; 408/202; 408/239 R
[58] Field of Search ............... 408/202, 186, 189, 191, 408/193, 197, 203, 211, 225, 238, 239

[56] References Cited

U.S. PATENT DOCUMENTS

| | | | |
|---|---|---|---|
| 2,390,744 | 12/1945 | Smith | 408/202 |
| 2,661,642 | 12/1953 | Marcucci | 408/191 |
| 2,673,479 | 3/1954 | Gruett | 408/193 |
| 2,826,104 | 3/1958 | Morin | 408/193 |
| 2,832,386 | 4/1958 | Van Dalen | 408/193 |

Primary Examiner—Harrison L. Hinson
Attorney, Agent, or Firm—Harold L. Stults

[57] ABSTRACT

Cutting tool assemblies each of which includes a cutting head attached to the end of a shank holder and a drill adjustably mounted to be moved longitudinally of the shank holder and projecting through the cutting head. In one form the cutting head is a chamfering tool which produces a countersink in the top of the hole in a workpiece bored by the drill. In another form the cutting head is a spot-facing tool which produces an annular flat surface around the hole bored in the workpiece by the drill. The cutting head is fixed to the shank holder and is driven thereby. The drill is clamped to the cutting head so that it is driven with the cutting head by the shank holder. Adjusting means is provided to move the drill axially in the shank holder so that the cutting head completes its cutting operation when a hole of the proper depth is drilled, or shortly thereafter.

5 Claims, 3 Drawing Figures

CUTTING TOOL ASSEMBLY

This invention relates to cutting tool assemblies and particularly to tools for simultaneously drilling a hole in metal and chamfering the hole or spot-facing it.

An object of this invention is to provide improved cutting tool assemblies of the above character which are superior to those available in the past. A further object is to overcome difficulties which have been encountered with such cutting tool assemblies. A further object is to provide for the above with constructions which are simple, sturdy and efficient in operation, and which are dependable for use under various conditions and uses. These and other objects will be in part obvious and in part pointed out below.

Figure 1:
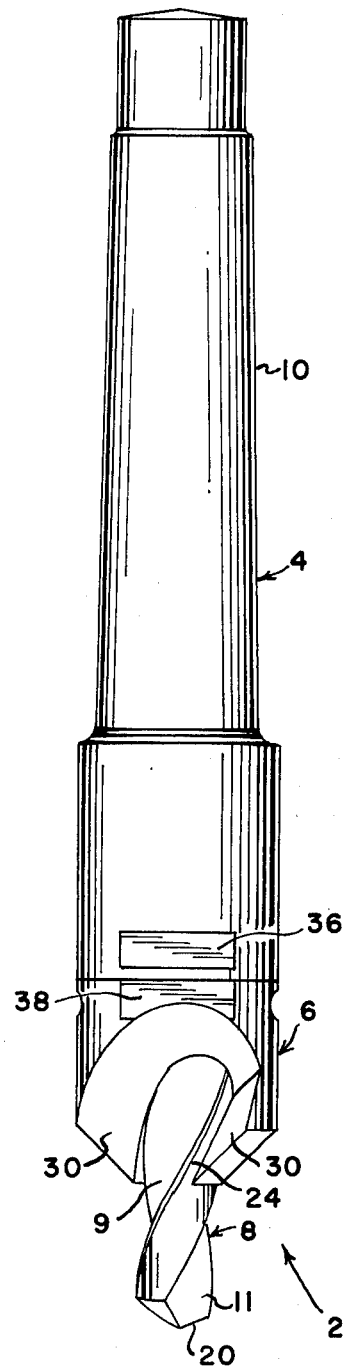
FIG. 1 is a side elevation of one embodiment of the invention.

Referring to FIG. 1 of the drawings, a cutting tool assembly 2 includes a tool holder 4 for a cutting head 6 and a drill 8 having flutes 9 and 11. Tool holder 4 has a shank 10 which is maintained in a known manner in any one of a number of types of boring machines, not shown.

Figure 2:
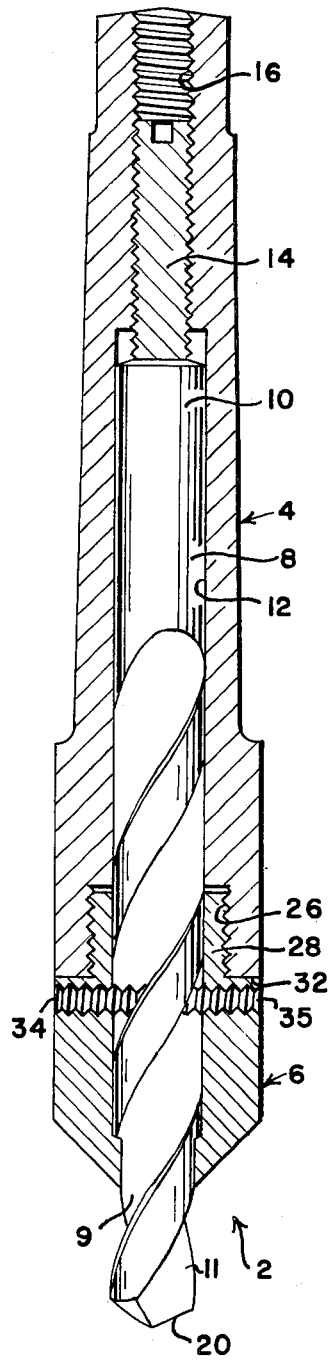
FIG. 2 is a vertical section of the embodiment of FIG. 1 with the drill shown in full lines; and, FIG. 3 is a view similar to FIG. 1 but showing another embodiment of the invention.

Referring to FIG. 2, the tool holder has a cylindrical cavity 12 of the diameter to snugly receive the drill 8. At the upper end of the tool holder there is an adjusting plug 14 which is threadably mounted in a bore extension 16, there being mating threads in the bore extension and external threads on the plug. The bottom end of plug 14 rests against the top of the shank portion 10 of the drill so as to provide rigid support holding the drill from moving upwardly with respect to the tool holder. The upper end of plug 14 has a hexaganol recess or pocket into which the end of a hexagonal wrench can be inserted to turn the plug when it is desirable to move drill 8 longitudinally of cavity 12. Drill 8 is a standard type and size of a twist drill with two flutes and with cutting edges 20 at its tip. Cutting head 6 is a chamfering tool which is of known construction having two cutting portions which are adapted to cut away the material of a workpiece around the top of a hole bored by drill 8. From the standpoint of the construction and operation of cutting head 6, reference can be made to U.S. Pat. No. 3,635,573, which shows two cutting portions 30 which are positioned respectively on the drill lands in trailing relationship to the margins 24 on the drill.

The bottom end of cavity 12 is of increased diameter so as to form an enlarged cavity 26, the peripheral surface of which is threaded, and cutting head 6 has a shank 28 which is threadably received in enlarged cavity 26. The annular face 32 on the cutting head 6 surrounding shank 28 is pressed tightly against the mating annular face on the bottom end of tool holder 4 so that the tool holder provides rigid support for the cutting head. A pair of screws 34 and 35 are threadably mounted in bores in the cutting head which extend parallel to face 32, and each screw has its end pressed tightly against the surface of the respective flute 9 or 11 in drill 8. The angle at which these screws are positioned is such as to provide a rigid clamping action which locks drill 8 to cutting head 6. Hence, drill 8 is prevented from moving upwardly relative to cavity 12 because its upper end rests against block 14. The drill is rigidly clamped to the cutting head and therefore to the tool holder by screws 34 and 35.

From the above, it is seen that the turning of the drill is effected solely by the cutting head, but that the drill is held from moving upwardly by plug 14. Therefore, the driving torque is delivered by the tool holder through the cutting head directly to the lower portion of the drill so that in a sense the tool holder and the cutting head act as an enlarged extension of the upper portion of the drill. The tool holder and the cutting head provide greater rigidity than is provided by the drill shank when a drill of this type is mounted in the conventional manner. Furthermore, the reduced distance between the cutting head and the tip of the drill is advantageous. It should also be noted that the drill provides firm support for the cutting head because the drill is firmly positioned in the hole produced in the workpiece and acts as a pilot for the cutting head. As indicated above, the cutting head is always firmly mounted in the tool holder and there are two wrench flats 36 on the opposite sides of the bottom of the tool holder and similar wrench flats 38 on the opposite sides of the cutting head by which wrenches are engaged to tighten and loosen the cutting head.

Figure 3:
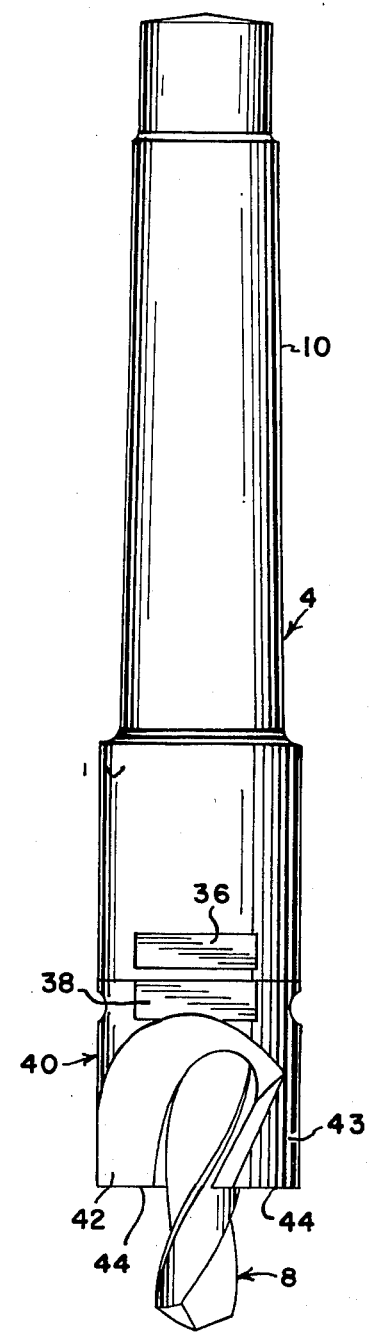

In the embodiment of FIG. 3, the construction is identical with that of FIGS. 1 and 2, except that cutting head 40 is a spot-facing tool. The spot-facing tool has two cutting portions 42 and 43 and it cuts the workpiece in the same manner as cutting head 6 except that it has flat bottom surfaces 44 and it produces an annular flat surface on the workpiece. Spot-facing tools are used to provide a smooth surface for a washer under the head of a bolt or cap screw extending into the workpiece. Spot-facing tools are also used to provide a flat on a curved top surface of a workpiece.

It is understood that modifications can be made in the illustrative embodiments and that other constructions can be provided without departing from the invention, all within the scope of the claims.

What is claimed is:

1. A cutting tool assembly comprising, the combination of, a drill having spiral flutes presenting flute surfaces extending from a shank portion to a cutting tip, an elongated tool holder having a central cylindrical cavity extending from one end thereof and snugly receiving said shank portion of said drill and a bore extension axially aligned and extending from said cavity to the other end of said tool holder, said bore extension being threaded, an adjusting plug positioned within said bore extension and having a cylindrical array of threads mating with the threads in said bore extension and having its end nearer said other end of said tool holder shaped to receive an adjusting tool to thereby turn said plug and move it longitudinally of said bore extension, said plug being positioned whereby it engages the end of said shank of said drill and prevents movement of said drill toward said other end of said tool holder, said cavity having an enlarged portion of greater diameter than the diameter of said drill adjacent said one end of said tool holder, said tool holder being threaded around the periphery of said enlarged portion of said cavity, a cutting head having a cylindrical body portion and a shank projecting axially therefrom and mating with and threaded into said enlarged portion of said cavity with the threads being such as to support said cutting head and provide for turning said cutting head directly from said tool holder through said shank of said cutting head, said cutting head having cutter portions which extend from said drill and which present cutting edges which are adapted to engage and cut away the material around a hole drilled in a work piece by said drill, and two screws threaded into bores extending axially of said body portion and locking said drill to said cutting head to said body portion by engagement with said flute surfaces of of said drill, whereby said cutting head is driven directly by said tool holder and is maintained in precise alignment with said hole by said drill and whereby said drill is driven directly by said cutting head.

2. The cutting tool assembly described in claim 1, wherein said cutting head is a chamfering tool.

3. The cutting tool assembly described in claim 1, wherein said cutting tool is a spot facing tool which is adapted to cut an annular surface on the work piece in a plane substantially transverse of the axis of said drill.

4. The cutting tool assembly described in claim 1, wherein said means locking said drill to said cutting head comprises a pair of screws threadably received on opposite sides of said cutting tool and each having its axis substantially transverse to a surface of a flute in said drill.

5. A cutting tool assembly comprising, the combination of, an elongated tool holder having a cylindrical cavity extending axially from one end thereof, a threaded bore extending from the other end of said tool holder to said cavity, a threaded plug adjustably positioned within said threaded bore and adapted upon rotation to be projected a predetermined distance into said cavity, a drill having a shank portion positioned within said cavity with the end of the drill positioned against the end of said threaded plug, said drill having a fluted portion which extends from said cavity, said tool holder having a threaded bore at said one end thereof of larger diameter than said cavity, a cutting head having a threaded shank which mates with and is threadably engaged in said threaded bore of said tool holder whereby said cutting head is rigidly mounted upon said tool holder and surrounds a portion of said fluted portion of said drill, said drill having a tip portion extending axially from said cutting head and having two spiral lands and adjacent margins which present cutting edges in trailing relationship to the respective flutes, said cutting head being generally cylindrical with a pair of cutter portions extending along and mating with the respective lands in trailing relationship to the respective margins, and a pair of screws threadably mounted in said cutting head in opposing relationship and having their adjacent ends clamping said drill in fixed relationship with respect to said cutting head and through said cutting head with respect to said tool holder, whereby said threaded plug prevents said drill from moving axially toward said other end of said tool holder and said screws transmit rotary movement from said tool holder and said cutting head directly to said drill.

* * * * *